United States Patent
Tsai et al.

(10) Patent No.: US 6,472,081 B1
(45) Date of Patent: Oct. 29, 2002

(54) SEMI-TRANSPARENT HIGH BARRIER FILM

(75) Inventors: Mingliang Lawrence Tsai, East Brunswick, NJ (US); Riccardo Balloni, Milan (IT)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/311,973

(22) Filed: Sep. 26, 1994

(51) Int. Cl.[7] .............................. B32B 15/04
(52) U.S. Cl. .............. 428/457; 428/346; 428/347; 428/348; 428/461; 428/463; 428/516; 428/520
(58) Field of Search ................. 428/349, 516, 428/910, 520, 461, 463, 346, 347, 457

(56) References Cited

U.S. PATENT DOCUMENTS

| | | | |
|---|---|---|---|
| 3,480,580 A | 11/1969 | Joyner et al. | 525/263 |
| 4,268,570 A * | 5/1981 | Imanaka et al. | 428/216 |
| 4,345,004 A | 8/1982 | Miyata et al. | 428/416 |
| 4,588,643 A * | 5/1986 | Krueger et al. | 428/422 |
| 4,741,957 A * | 5/1988 | Park | 428/349 |
| 4,888,237 A | 12/1989 | Balloni et al. | 428/347 |
| 5,153,074 A | 10/1992 | Migliorini | 428/463 |

* cited by examiner

Primary Examiner—Leszek Kiliman
(74) Attorney, Agent, or Firm—Rick F. James

(57) ABSTRACT

An oriented multi-layer film combination comprising:

(a) a core layer of polypropylene homopolymer or copolymer;

(b) a metallizable skin layer comprising a member having a wetting tension of at least 36 dynes/cm selected from the group consisting of ethylene-vinyl alcohol copolymer (EVOH), poly(vinyl alcohol) (PVOH), and polyester, adjacent one surface of said core layer, said layer being metallized to a metal thickness no greater than 5 nm; and (c) adhesion promoting amounts of an adhesive selected from the group consisting of maleic acid anhydride, modified polypropylene homopolymer or copolymer, high density polyethylene, and ethylene-vinyl acetate (EVA) copolymer, disposed between (a) and (b).

10 Claims, No Drawings

SEMI-TRANSPARENT HIGH BARRIER FILM

BACKGROUND OF THE INVENTION

This invention relates to a semi-transparent multi-layer film structure that has a metallized surface. The bonding of metals, such as, aluminum, silver, chromium, etc., to plastic films and the gas barrier developed, has allowed such films to replace metallic foils in many instances. The flexibility of the films necessitates the formation of a strong metal/plastic bond and a number of approaches have been developed for providing such bonding. In some cases a special primer layer must be applied to the base layer in order to achieve an effective bond between the metal and the substrate. In many cases a thermoplastic surface must be corona discharged treated in order for there to be an effective bond between the metal and the thermoplastic surface. Gas barrier properties will also depend upon the condition of the surface on which the metal is deposited.

It is known in the art to enhance the metallization performance of polypropylene-based films by using a polymer other than homopolymer polypropylene. U.S. Pat. No. 4,345,004 to All et al. discloses a metallizable skin made of an ethylene-propylene copolymer. U.S. Pat. No. 4,741,957 to Park describes a skin layer made of polyamide, polyester, or polycarbonate polymers which provides improved surface properties for lamination and printing. Japanese Patent 55-126057 discloses the use of a 0.60 mil EVOH film with no elongation for metal deposition. Japanese Patent No. 1-267032 discloses 0.20 to 16 mil EVOH film on which is deposited a silicon oxide, which film can be heat treated to enhance oxygen barrier and water resistance. Generally such films provide enhanced barrier properties provided that the films are metallized at a critical thickness, i.e., an optical density of greater than 2, or a metal thickness of 10 to 100 nm.

U.S. Pat. No. 5,153,074 to Migliorini discloses a metallized film combination comprising a propylene polymer substrate modified with maleic anhydride, a skin layer of EVOH metallized with an aluminum coating of 100 to 500 angstroms (10 to 50 nm) to provide a film having an optical density of 1.5 to 3.0, and an optional heat sealable skin layer.

It is an object of the present invention to provide a semi-transparent, heat sealable metallized film having moderate light/UV and microwave transparency which nonetheless exhibits excellent oxygen gas barrier and water vapor barrier.

SUMMARY OF THE INVENTION

In accordance with the present invention an oriented multi-layer film combination comprises:
  (a) a core layer of polypropylene homopolymer or copolymer;
  (b) a metallizable skin layer comprising a member selected from the group consisting of ethylene-vinyl alcohol copolymer (EVOH), poly/vinyl alcohol) (PVOH), and polyester, adjacent one surface of said core layer, said layer being metallized to a metal thickness no greater than 5 nm; and
  (c) adhesion promoting amounts of an adhesive selected from the group consisting of maleic acid anhydride modified polypropylene homopolymer or copolymer, high density polyethylene, and ethylene-vinyl acetate (EVA) copolymer, disposed between (a) and (b). In one embodiment of the invention, the multilayer film combination further comprises (d) a heat sealable layer disposed on the other surface of said core layer.

This film combination presents a high surface energy surface to which can be strongly bonded a very thin metallized layer, e.g., a thickness of no more than 5 nm, to provide a metallized film of optical density less than 1.5, preferably no greater than 1.

The present invention also relates to a method of forming a metallized multi-film layer combination which comprises
  (a) coextruding i) a core layer of polypropylene homopolymer or copolymer, ii) a metallizable skin layer comprising a member selected from the group consisting of ethylene-vinyl alcohol copolymer (EVOH), poly(vinyl alcohol) (PVOH), and polyester, adjacent one surface of said core layer; wherein adhesion promoting amounts of an adhesive selected from the group consisting of maleic acid anhydride modified polypropylene homopolymer or copolymer, high density polyethylene, and ethylene-vinyl acetate (EVA) copolymer are disposed between (i) and (ii);
  (b) quenching the coextruded product of (a) on a casting drum in a water bath to form a base sheet having a thickness of 120 to 1600 mil;
  (c) orienting the base sheet in the machine direction by stretching 4 to 8 times, and in the transverse direction by stretching 5 to 12 times to form an oriented film having a thickness of 0.5 to 2.0 mil;
  (d) metallizing the metallizable skin layer to provide a layer of deposited metal of no greater than 5 nm.

In one embodiment, the coextruding is further carried out with iii) a heat sealable layer disposed on the other surface of said core layer.

DETAILED DESCRIPTION OF THE INVENTION

The core substrates contemplated herein include the homopolymers and copolymers of polypropylene, particularly preferred are isotactic polypropylenes containing at least 80% by weight of isotactic polypropylene. This material has a density ranging from about 0.90 to 0.91, a crystalline melting point of about 160–165° C., and a melt index of about 2–6, preferably 3–4, grams/10 minutes. This material is about 80–100% isotactic, and preferably 95–96% isotactic. Commercially available materials of this description are Exxon 4252, ARCO W472, and Fina 3371. Suitable core polypropylene materials are further disclosed in U.S. Pat. No. 4,888,237 to Balloni et al which is incorporated herein by reference in its entirety.

The surface of the polypropylene or polypropylene copolymer is modified by a particular functionalized adhesive material which serves to tie the polypropylene substrate and the metallizable layer together. This adhesive can be mixed into or applied on top of the polypropylene substrate, so that the metallizable skin layer will aggressively adhere to this so-modified material. If a maleic anhydride modified polypropylene homopolymer or copolymer becomes a part of the substrate surface either by being interblended therewith or by being extruded thereon as a surface skin layer, this then becomes an ideal surface for receiving the metallizable skin layer of the present invention. This adhesive modified surface layer or adhesive skin layer itself cannot be separated from the propylene homopolymer or copolymer substrate. By a "maleic anhydride modified polypropylene homopolymer or copolymer" is meant the product resulting from the reaction between maleic anhydride and the thermal degradation product of polypropylene or polypropylene copolymer. Examples of this material can be found disclosed in U.S. Pat. No. 3,480,580 issued Nov. 25, 1969, the disclosure of which is incorporated herein by reference in its entirety. Particular attention is directed to examples 3, 4 and 6 of the specification.

The maleic anhydride modified polypropylene or a copolymer thereof can be prepared by a fairly simple process. For example, about 125 grams of low viscosity polypropylene of 3300 centipoise at 190° C. and 7.5 grams of maleic anhydride are placed in a 500 ml glass round-bottom flask. This flask has three necks and is fitted with a metal sweeper, a dropping funnel and a steam-jacketed condenser to return maleic anhydride which boils out of the reaction mixture. The flask is lowered into a Wood's metal bath at a temperature of about 200° C. After about 1 hour the product is poured from the flask onto a metal tray. The waxy product will have a melt viscosity of 3600 centipoise at 190° C. and a saponification number of 16.

Low viscosity polymers can also be produced in the above manner from low molecular weight 98–96/2–4 propylene/ethylene copolymers, 50/50 propylene/butene-1 copolymer, 95/5 propylene/pentene-1 copolymer, 90/10 propylene/hexene-1 copolymer, 80/20 propylene/4-methyl-1-pentene copolymer, 75/25 propylene, dodecene-1 copolymer and 90/10 butene-1/hexene copolymer. In general, propylene copolymerized with another alpha olefin, including ethylene. The procedure for the use of a maleic anhydride modified polypropylene homopolymer or copolymer, when this material is interblended into the base layer is exemplified by the following technique. A maleic anhydride modified polypropylene, e.g., Epolene E-43, a maleic anhydride modified polypropylene obtained from Eastman Kodak Company, melt-blended with a polypropylene homopolymer, such as, Exxon 4252 (85 parts) to give a 15% master batch. 20 parts of the master batch is dry blended with 80 parts of the polypropylene copolymer to give a resin blend containing 3% of the maleic anhydride modified polypropylene. This blend will contain sufficient maleic anhydride-modified polypropylene at the surface of the substrate to aggressively bond the polyamide thereto. The alternative method of making available the maleic anhydride-modified polypropylene homopolymer or copolymer at the surface of the substrate is to coextrude the base polymer with a skin layer containing the maleic anhydride-modified polymer.

Additional materials suitable for use as adhesives are high density polyethylene (HDPE) such as Quantum Plexar 201, available from Quantum Chemical Corp., of Cincinnati, Ohio, and ethylene-vinyl acetate copolymer, e.g., Bynel CXA, available from DuPont Co., Wilmington, Del.

The contemplated metallizable skin layers consist essentially of a member selected from the group consisting of ethylene-vinyl alcohol copolymer (EVOH), poly(vinyl alcohol) (PVOH), and polyester. The EVOH resins useful in this invention include resins having a copolymerized ethylene content of about 20 to 80 mole %, especially about 25 to 50 mole %. Copolymers of lower than about 15 to 20 mole % ethylene, tend to be difficult to extrude while those above 60 or 65 mole % ethylene have reduced oxygen barrier performance. These polymers will have a saponification degree of at least 50%, preferably at least 90%, especially at least 95%. A degree of saponification of less than 90% results in inferior oxygen barrier properties. The ethylene vinyl alcohol copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on the total copolymer. The melting points of these ethylene vinyl alcohol polymers are generally between 150 and 190° C.

Ethylene vinyl alcohol polymers are normally prepared by copolymerization of ethylene with vinyl acetate, followed by hydrolysis of the vinyl acetate component to give the vinyl alcohol group. This process is well known in the art. The PVOH polymer used can be a polyvinyl alcohol homopolymer or copolymer, e.g. Vinol 325 (a 98% hydrolyzed medium viscosity polyvinyl alcohol, available from Air Products and Chemicals, Inc. of Allentown, Pa., or ELVANOL 71–30, available from DuPont Co., Wilmington Del.

Suitable polyesters employed for the metallizable skin layers include polyethylene terephthalate (PET). PET is the product of a condensation reaction between ethylene glycol and ethylene terephthalic acid. Such PETs include Petlon, available from Mobay Corp., Pittsburgh, Pa.

As indicated above the metallizable skin layer comprises the surface for receipt of a vacuum metallization. A further advantage of employing such materials is that it is not necessary to corona discharge treat the metallizable surface layer prior to metallization because it inherently has a wetting tension of at least 36 dynes/cm, as determined by ASTM 2578–67 (Dyne Solution Test). Higher wetting tensions are, however, obtainable by employing corona or flame treatment processes. The inherent polar nature of the metallizable skin results in metal adhesion levels far exceeding those obtainable with a treated polypropylene homopolymer skin. The metallized OPP film also exhibits excellent bond strength in both adhesive and extrusion lamination. Further desirable properties of the base film for metallization, are that it displays an excellent oxygen gas barrier when metallized as well as optical clarity and metal uniformity. It also retains the other desirable properties of metallized oriented polypropylene film, such as, good water vapor barrier.

Metallization is carried out in accordance with vacuum metallization procedures using metals such as aluminum, zinc, copper (and alloys thereof such as bronze), silver, gold, and the like, aluminum being preferred for its economy, especially where packaging applications are concerned. A suitable metallizing process consists of placing a roll of film in a vacuum chamber at a pressure of $1 \times 10^{-3}$ to $1 \times 10^{-6}$ torr. The film is then unwound and travels above a cloud of aluminum, where condensation occurs to produce a very thin aluminum coating no greater than 5 nm in thickness, e.g., from 0.5 to 5 nm. The aluminum cloud is produced by feeding aluminum wire on resistance heated intermetallic boats. The metallized film is then rewound, and removed from the chamber.

It is to be understood that opposite the metallizable surface, i.e., on the other side of the core, the multi-layer film of the present invention has a heat-seal layer applied thereto. Preferred heat-seal layers include ethylene-propylene random copolymer, and an ethylene-propylene-butene-1 terpolymer, ionomer, e.g., Surlyn, available from Dupont Co. of Wilmington, Del., etc., and copolyester, e.g., PCTA, PETG, PCT, and PCTG. Such copolyester materials are available from M.A. Industries, Inc., Peachtree City, Ga. Suitable polyolefin sealants, and their combination with polypropylene cores are further disclosed in U.S. Pat. No. 4,888,237, incorporated herein by reference.

EXAMPLE

A three layer sheet was produced by coextrusion, employing the following materials:

A-EVOH with 48% ethylene content was coextruded with a polypropylene homopolymer, Fina 3371X, available from Fina Oil and Chemical Division, Dallas, TX, to make a 0.70 mil film, using a maleic anhydride grafted polypropylene (Mitsui Admer QF551A) available from Mitsui Plastics, Inc. of White Plains, NY, as an adhesion promoting layer. The coextrudate can also be coextruded with a heat sealable E-P-B terpolymer, e.g. Chisso XF 7700.

The coextrudate was quenched at 150° F. on a cast roll, reheated on rolls to 270° F. and stretched 5 times its original length in the machine direction. The sheet was subsequently stretched eight times its original width in a tenter apparatus at 310–330° F. and corona treated on the EVOH side before being wound on a roll. Line speed was 250 fpm. The overall film thickness was 70 gauge. The EVOH layer was approximately 10 gauge units and the terpolymer layer was approximately 4 gauge units. The off-line wetting tension of the EVOH side of the film was 50 dynes/cm. Four samples of the resulting film were vacuum metallized with aluminum on the EVOH skin to optical densities of 0.1, 0.4, 0.7 and 1.0, respectively, employing conventional vacuum metallization techniques. Unmetallized sample had an optical density of 0.03.

The characteristics of the four vacuum metallized samples and unmetallized sample are set out below in the Table. Water vapor transmission rate was measured in g/100 in$^2$/24hr at 100° F., 90% relative humidity. The oxygen transmission rate was measured in cc/100 in$^2$/24hr, at 73° F., 0% relative humidity.

TABLE

|  | O.D. = 0.03 (Control) | O.D. = 0.1 | O.D. = 0.4 | O.D. = 0.7 | O.D. = 1.0 |
|---|---|---|---|---|---|
| Light Trans.[a] | 93% | 80% | 40% | 20% | 10% |
| UV Trans.[b] | 85% | 75% | 57% | 38% | 20% |
| WVTR[c] | 0.55 | 0.50 | 0.19 | 0.13 | 0.12 |
| OTR[d] | 7.68 | 0.98 | 0.69 | 0.60 | 0.37 |
| Flavor/Aroma | Good | Excellent | Excellent | Excellent | Excellent |

Note:
[a]Light Transmission was measured at 550 nm wavelength.
[b]UV Transmission was determined at 300 nm wavelength.
[c]Water Vapor Transmission Rate was measured at 100° F., 90% R
[d]Oxygen Transmission Rate was measured at 73° F., 0% RH.

This invention has been described with particular reference to preferred embodiments, but it will be understood that variations and modifications can be effected within the spirit and scope of the invention as described here and above and as defined in the appended claims.

What is claimed is:

1. An oriented multi-layer film combination comprising:
   (a) a core layer of polypropylene homopolymer or copolymer;
   (b) metallized skin layer comprising a member having a wetting tension of at least 36 dynes/cm selected from the group consisting of ethylene-vinyl alcohol copolymer and, (poly(vinyl alcohol), adjacent one surface of said core layer, said layer being metallized to a metal thickness no greater than 5 nm; and
   (c) adhesion promoting amounts of an adhesive selected from the group consisting of maleic acid anhydride modified polypropylene homopolymer or copolymer, high density polyethylene, and ethylene-vinyl acetate copolymer, disposed between (a) and (b).

2. The multilayer film combination of claim 1 which further comprises (d) a heat sealable layer disposed on the other surface of said core layer.

3. The multilayer film combination of claim 2 wherein said metallized skin layer (b) consists essentially of ethylene vinyl alcohol copolymer.

4. The multilayer film combination of claim 3 wherein said adhesive is maleic acid anhydride modified polypropylene homopolymer or copolymer.

5. The multilayer film combination of claim 4 wherein said metallized skin layer (b) is metallized with aluminum.

6. The multilayer film combination of claim 5 having an optical density less than 1.5.

7. The multilayer film combination of claim 5 having an optical density no greater than 1.

8. The multilayer film combination of claim 1 wherein said core layer (a) is a polypropylene homopolymer.

9. The multilayer film combination of claim 1 wherein said core layer (a) is a polypropylene copolymer.

10. The multilayer film combination of claim 2 wherein (a), (b), (c), and (d) are coextruded.

* * * * *